(12) United States Patent
Doshi

(10) Patent No.: US 10,521,843 B2
(45) Date of Patent: Dec. 31, 2019

(54) SYSTEMS AND METHODS FOR IMPLEMENTING ELECTRONIC WARDROBES

(71) Applicant: PayPal, Inc., San Jose, CA (US)

(72) Inventor: Kalpesh Ashok Doshi, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 1265 days.

(21) Appl. No.: 14/255,848

(22) Filed: Apr. 17, 2014

(65) Prior Publication Data

US 2015/0302501 A1 Oct. 22, 2015

(51) Int. Cl.
*G06Q 30/06* (2012.01)
*G06Q 50/00* (2012.01)
*H04W 4/80* (2018.01)

(52) U.S. Cl.
CPC ..... *G06Q 30/0623* (2013.01); *G06Q 30/0633* (2013.01); *G06Q 50/01* (2013.01); *H04W 4/80* (2018.02)

(58) Field of Classification Search
None
See application file for complete search history.

(56) References Cited

U.S. PATENT DOCUMENTS

| 6,901,379 B1* | 5/2005 | Balter | G06Q 30/0643 434/395 |
| 8,738,069 B2* | 5/2014 | Yamamoto | H04W 52/383 370/318 |
| 2002/0121980 A1* | 9/2002 | Wan | G06Q 10/087 340/572.1 |
| 2002/0130178 A1* | 9/2002 | Wan | G06F 17/30876 235/383 |

(Continued)

FOREIGN PATENT DOCUMENTS

WO   WO 2012/110828   8/2012

OTHER PUBLICATIONS

Ferguson GT. Have Your Objects Call My Objects. Harvard Business Review. 2002;80(6):138-144. http://search.ebscohost.com/login.aspx?direct=true&db=bth&AN=6756423&site=eds-live&scope=site. Accessed Aug. 14, 2019. (Year: 2002).*

(Continued)

*Primary Examiner* — Kathleen Palavecino
*Assistant Examiner* — Lance Y Cai
(74) *Attorney, Agent, or Firm* — Haynes and Boone, LLP

(57) ABSTRACT

A system or method is provided to implement electronic wardrobes for consumers. When a user makes a purchase, the system may determine whether the purchase includes wearable items, such as clothes or other wearable accessories. An electronic wardrobe may be created for the user to store the wearable items purchased by the user. The electronic wardrobe of the user may be broadcasted by the user's (Continued)

mobile device to other nearby consumers via Near Field Communication (NFC), such as low energy Bluetooth (BLE) communication. For example, if the user is wearing a shirt and a nearby consumer wishes to find out more about the shirt, the consumer may discover the user's electronic wardrobe via NFC to find information about the shirt, such as where the shirt was purchase, the make and model of the shirt, the price of the shirt, and the like.

21 Claims, 5 Drawing Sheets

(56) References Cited

U.S. PATENT DOCUMENTS

| | | | |
|---|---|---|---|
| 2008/0120167 A1* | 5/2008 | Guenster | G06Q 30/0201 |
| | | | 705/7.29 |
| 2008/0195973 A1* | 8/2008 | Shimkin | G06Q 10/087 |
| | | | 715/817 |
| 2010/0191770 A1 | 7/2010 | Cho et al. | |
| 2013/0072114 A1* | 3/2013 | Abhyanker | H04B 5/0037 |
| | | | 455/41.1 |
| 2013/0215116 A1* | 8/2013 | Siddique | G06Q 30/0643 |
| | | | 345/420 |
| 2013/0282438 A1* | 10/2013 | Hunter | G01S 1/02 |
| | | | 705/7.32 |
| 2014/0038526 A1 | 2/2014 | Ennis et al. | |
| 2014/0114884 A1* | 4/2014 | Daway | G06Q 90/00 |
| | | | 706/11 |
| 2014/0180864 A1* | 6/2014 | Orlov | G06Q 30/0631 |
| | | | 705/26.7 |
| 2014/0279186 A1* | 9/2014 | Juan | G06Q 30/0631 |
| | | | 705/26.7 |

OTHER PUBLICATIONS

US Commissioner for Patents as International Searching Authority, Alexandria, Virginia, International Search Report for PCT/US15/20815 , dated Jul. 31, 2015, 4 pages.

* cited by examiner

SYSTEMS AND METHODS FOR IMPLEMENTING ELECTRONIC WARDROBES

BACKGROUND

Field of the Invention

The present invention generally relates to systems and methods for implementing electronic wardrobes.

Related Art

Consumers' purchase habits are influenced by people they know and/or people around them. In particular, many consumers may be enticed to purchase certain items, because they see someone they know or someone around them wearing the same items. For example, a consumer may see someone at a shopping mall wearing a nice new shirt and the consumer may wish to purchase the same shirt. Nevertheless, it may be difficult for the consumer to attempt to obtain additional information about the shirt without knowing where the shirt was purchased and the brand or model number of the shirt. Thus, there is a need for a system or method that implements an electronic wardrobe of a user to allow the user to share information about his/her wearable items with others.

Figure 1:
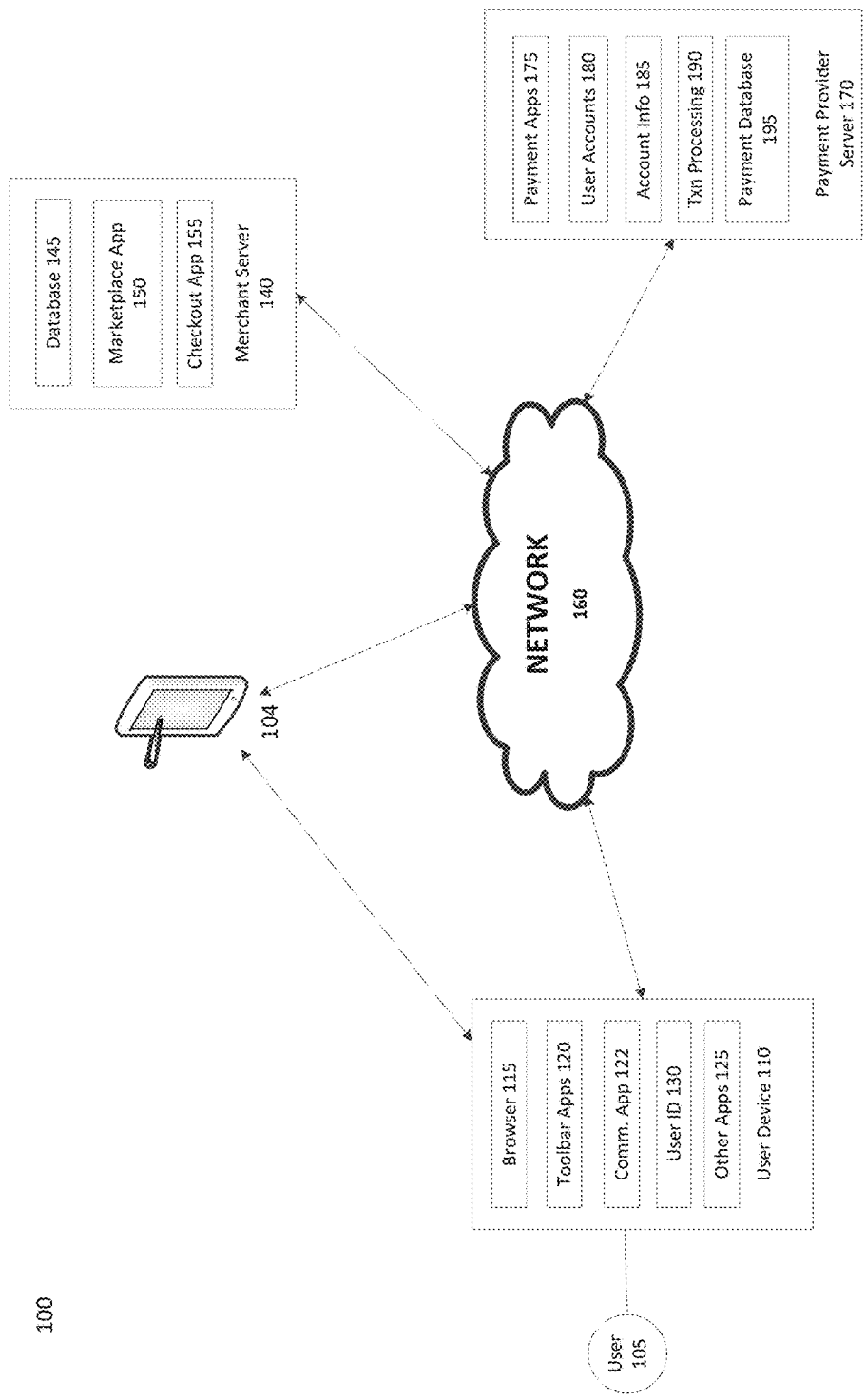
FIG. 1 is a block diagram of a networked system suitable for implementing electronic wardrobes according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a system or method is provided to implement electronic wardrobes for consumers. When a user makes a purchase, the system may determine whether the purchase includes wearable items, such as clothes or other wearable accessories. An electronic wardrobe may be created for the user to store the wearable items purchased by the user. The electronic wardrobe of the user may be broadcasted by the user's mobile device to other nearby consumers via Near Field Communication (NFC), such as low energy Bluetooth (BLE) communication. For example, if the user is wearing a shirt and another consumer wishes to find out more about the shirt, the consumer may discover the user's electronic wardrobe via NFC to find information about the shirt, such as where the shirt was purchased, the make and model of the shirt, the price of the shirt, and the like.

In an embodiment, if a purchase transaction was made by another consumer based from the user's electronic wardrobe, the user may be rewarded with certain incentives, such as reward points, discounts, electronic cash, and the like. Thus, manufacturers or merchants of wearable items may entice users to share their electronic wardrobes to provide advertisement for the wearable items. Further, the system may allow users to become walking models for various wearable items.

In an embodiment, the user may link his/her electronic wardrobe to his/her social network accounts, such as Facebook or Twitter. As such, the system may allow the user to share his/her electronic wardrobe with friends or others on the social network. Further, the system may allow other users to bookmark or follow the user's electronic wardrobe. For example, if the user maintains certain trendy fashion in clothing or electronic gadgets, other users may wish to follow the user's electronic wardrobe to be informed of the latest trend in fashion. Further, manufacturers or merchants of wearable products may sponsor certain users who are well known or famous to endorse their wearable products by wearing and including their wearable products in the users' electronic wardrobes.

In an embodiment, the system may allow the user to control what items of the user's electronic wardrobe to share. For example, the user may select only item(s) the user is wearing that day, all items that have been purchased over the last month (or other time period), all wearable items purchased, only visible items purchased, only items based on time and/or location (e.g., summer wear items, dress up items if user going to a formal function, etc.).

In an embodiment, the system may allow the user to control who to broadcast wardrobe information to. For example, the user may choose to broadcast to everyone, only to devices belonging to others known to the user (such as in a user contact list, social network, etc.), only to devices belonging to friends (such that the user may not want co-workers from knowing what types of items the user buys, especially if they are extravagant items), etc.

FIG. 1 is a block diagram of a networked system 100 suitable for implementing a process for implementing customer movement tracking analysis according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchant server 140, a payment provider server 170, and a communication device 104 in communication over a network 160. Payment provider server 170 may be maintained by a payment service provider, such as PayPal, Inc. of San Jose, Calif. A user 105, such as a sender or consumer, utilizes user device 110 to perform a transaction using payment provider server 170. User 105 may utilize user device 110 to initiate a payment transaction, receive a transaction approval request, or reply to the request. Note that transaction, as used herein, refers to any suitable action performed using the user device, including payments, transfer of information, display of information, etc. For example, user 105 may utilize user device 110 to initiate a deposit into a savings account. Although only one merchant server is shown, a plurality of merchant servers may be utilized if the user is purchasing products or services from multiple merchants.

In some embodiments, user device 110 may download a shopping application from payment provider server 170 or from merchant server 140. The shopping application may allow user 105 to purchase and/or pay for various products or services from a merchant. The shopping application may create an electronic wardrobe that stores information regarding wearable items purchased by user 105. Wearable items may include clothing, shoes, hats, wearable electronic devices, jewelries, watches, perfumes/colognes, cosmetic products, and the like. User device 110 may include a Bluetooth device configured to implement BLE communication. User device 110 may broadcast user 105's wardrobe to other nearby communication devices, such as communication device 104.

User device 110, merchant server 140, payment provider server 170, and communication device 104 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, laptop computer, a wearable computing device, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise utilize a smart wallet through the payment provider as discussed above. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 may include a Bluetooth device configured to implement low energy Bluetooth (BLE) communication. For example, user device 110 may communicate with other mobile devices, such as communication device 104, via BLE communication. Communication device 104 may be a mobile device operated by another consumer. Communication device 104 may include some or more of similar components as that of user device 110.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes service providers as well as banks and retailers. Merchant server 140 may include a database 145 identifying available products (including digital goods) and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 includes one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

In some embodiments, payment provider server 170 may maintain a wardrobe database including electronic wardrobes of users. The electronic wardrobe of a user may store wearable items purchased or owned by the user, description of each wearable items, including where and when the wearable items are purchased, make and model of wearable items, picture, video, size, color, specification, website, URL link, price, and the like.

A transaction processing application 190, which may be part of payment application 175 or separate, may be configured to receive information from user device 110 and/or merchant server 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105, as well as create new accounts if necessary.

Figure 2:
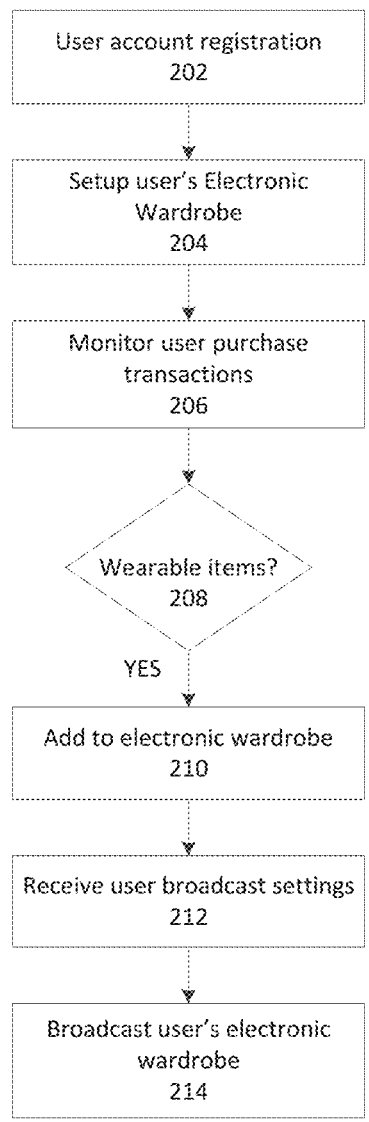
FIG. 2 is a flowchart showing a process for setting up and broadcasting an electronic wardrobe according to one embodiment.

FIG. 2 is a flowchart showing a process 200 for setting up and broadcasting an electronic wardrobe according to one embodiment. At step 202, user 105 may register or set up a payment or purchase account at payment provider server 170 or at merchant server 140. In particular, user 105 may use user device 110 to install a payment/shopping app from payment provider server 170 or merchant server 140. As such, user 105's user device 110 is linked or associated with user 105's account.

At step 204, payment provider server 170 may set up an electronic wardrobe associated with user 105's account. Payment provider server 170 may find wearable items purchased by user 105 by searching user 105's purchase history. Wearable items may be identified by their name, description, Universal Product Code (UPC), image, merchant, manufacturer, and the like. In an embodiment, payment provider server 170 may ask user 105 whether certain item is a wearable item that is to be stored in user 105's electronic wardrobe.

The electronic wardrobe may include a list of wearable items purchased or owned by user 105. Each wearable item may have a profile including information regarding the item's name, category, UPC, manufacturer, merchant, picture, description, size, color, URL to merchant or product website, price, and the like. In an embodiment, the item profile may include user 105's comments regarding the item. For example, user 105 may comment on the history of the item and other matching wearable items. Each wearable item in the electronic wardrobe may include a privacy setting indicating who may view the wearable item.

Payment provider server 170 may provide an interface that allows user 105 to adjust various privacy settings of the electronic wardrobe. In particular, user 105 may designate who may view user 105's electronic wardrobe. For example, user 105 may link the electronic wardrobe with user 105's social network and allow only friends in user 105's social network to view user 105's electronic wardrobe. User 105 also may designate one or more wearable items in the electronic wardrobe to be visible and designate other wearable items to be hidden. In an embodiment, the system may allow user 105 to set a privacy setting for each wearable item, such that each wearable item is viewable by a defined group of people. For example, user 105 may allow a shirt to be viewed by all, but allow an under garment to be viewed by immediate friends only.

In an embodiment, the system may allow user 105 to set certain wearable items as current and other wearable items as inactive. For example, wearable items that user 105 are currently wearing or utilizing may be set as current and wearable items that user 105 have not worn or utilized for a predetermined length of time may be set as inactive. Current wearable items may be presented at the front or top of the list in user 105's electronic wardrobe. Inactive wearable items may be hidden from view or presented at the end of the list.

In an embodiment, user 105 may allow wearable items that are current to be viewable by others. For example, wearable items that are purchased or added to the electronic wardrobe less than a month ago may be viewable by others, while wearable items that have been in the electronic wardrobe for more than a month may be hidden from others. In another example, user 105 may select only wearable item(s) user 105 is wearing that day to be viewable by others on that day. User 105 may designate wearable items in the electronic wardrobe that user 105 is wearing for that day. In an embodiment, user 105 may set wearable items to be viewable by others based on time and/or location. For example, only formal or business attires viewable during business hour or at a work place. Summer wear items may be viewable on weekends or at a beach.

The electronic wardrobe may be stored along with user 105's account. In an embodiment, the electronic wardrobe may be formatted to be displayed on user device 110 or communication device 140. A unique identification number may be assigned to each electronic wardrobe. In some embodiment, a unique URL link may be assigned to each wardrobe. The unique URL may direct applications or browsers to the electronic wardrobe via network 160.

At step 206, payment provider server 170 may monitor user 105's purchase transactions. In particular, at step 208, payment provider server 170 may determine if the purchase transactions include wearable items, such as clothing, wearable electronics, sun glasses, watches, jewelry, hats, shoes, accessories, cosmetic products, perfume/cologne, and the like. The wearable items may be identified based on merchant, description, product UPC, picture, and the like. In an embodiment, the system may inquire user 105 whether certain purchased items are wearable items.

If the purchase items are wearable items, the wearable items may be added to the electronic wardrobe at step 210. In an embodiment, payment provider server 170 may inquire user 105 whether a wearable item should be added to user 105's electronic wardrobe. In particular, payment provider server 170 may inform user 105 that the merchant of the wearable item is offering incentives, such as reward point, instant or future discount, if user 105 adds the wearable item into user 105's electronic wardrobe to be discovered and viewed by others. Further, if another consumer purchases the wearable item based from viewing the wearable item at user 105's electronic wardrobe, the merchant may offer additional incentives, such as cash backs, reward points, further discounts, to user 105. For example, if another consumer makes a purchase by clicking through user 105's electronic wardrobe, user 105 may receive additional incentives from the merchant. In one embodiment, the incentive is provided only if a broadcast item is purchased by another or an item is purchased from the same merchant offering the broadcast item.

In an embodiment, the merchant may offer incentives based on user 105's popularity on the social network. For example, a greater amount of incentives may be offered to users who have more following or friends on their social network. Thus, incentives may be offered to users based on their social network status. Users with more popular or higher social network status may be offered more incentives to advertise wearable items for the merchant.

At step 222, payment provider server 170 may receive user 105's broadcast settings. In particular, user 105 may set the broadcast settings of each wearable item in the electronic wardrobe. For example, user 105 may allow all users to view a certain wearable item while allow only friends to view certain wearable item. In an embodiment, the merchant may offer different incentives to user 105 based on the broadcast settings. For example, greater incentives may be given for more open broadcast settings, e.g., broadcast settings that allow more public views.

In an embodiment, user 105 may set when and where the electronic wardrobe or certain item(s) of the electronic wardrobe is to be broadcasted. For example, user 105 may prohibit the electronic wardrobe to be broadcasted at work or during work hours. User 105 may allow broadcasting at parties or at certain public places. User 105 may allow a picture of user 105 to be broadcasted with the electronic wardrobe. Thus, other nearby users may view the included picture of user 105 to recognize user 105's electronic wardrobe.

At step 214, user 105's electronic wardrobe may be broadcasted by user device 110 to nearby devices. In an embodiment, user device 110 may broadcast the unique identification number of user 105's electronic wardrobe. When other users receive the broadcast of the unique identification number, the other users may access user 105's electronic wardrobe stored at payment provider server 170 based on the unique identification number of user 105's electronic wardrobe. In another embodiment, user device 110 may broadcast a URL link indicating the directory or file location of user 105's electronic wardrobe stored at payment provider server 170. Thus, other users may access user 105's electronic wardrobe based on the URL link. In still another embodiment, user device 110 may broadcast the unique product number, such as UPC, of each wearable item in user 105's wardrobe. In an embodiment, the electronic wardrobe may be broadcasted along with user 105's picture. Thus, viewers may associate the electronic wardrobe with user 105 by matching user 105's picture with user 105 in person.

Accordingly, process 200 may be implemented to create and update an electronic wardrobe for a user. In particular, wearable items may be identified from the user's purchase history and/or purchase transactions. The wearable items may be added to the user's electronic wardrobe. Further, the system may allow the user to set privacy settings for the electronic wardrobe and for each wearable item. The privacy settings may designate who may view the wearable items or the electronic wardrobe. Finally, information regarding the user's electronic wardrobe may be broadcasted by user's device to other nearby users via NFC. Broadcast information may be limited in range to only others very close to the user (such as in more congested areas) or a more extended range in areas more sparsely populated (such that even others farther away may be able to see what the user is wearing).

Figure 3:
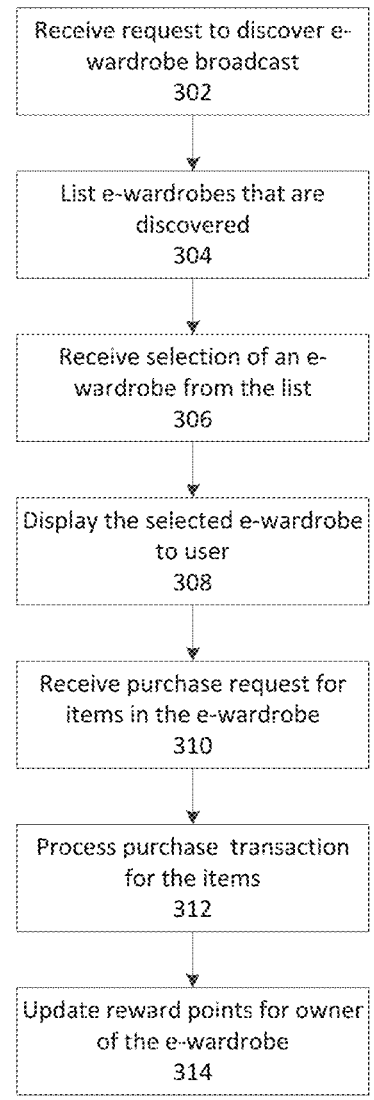
FIG. 3 is a flowchart showing a process for discovering and displaying nearby electronic wardrobes according to one embodiment.

FIG. 3 is a flowchart showing a process 300 for discovering and displaying nearby electronic wardrobes according to an embodiment. At step 302, user device 110 or payment provider server 170 may receive a request from user 105 to discover electronic wardrobes of other users located near user 105. For example, if user 105 sees another consumer wearing or carrying an item that user 105 is interested in, user 105 may activate a shopping or payment app on user device 110 to begin discovering electronic wardrobes broadcasted by other users near user 105.

Figure 5:
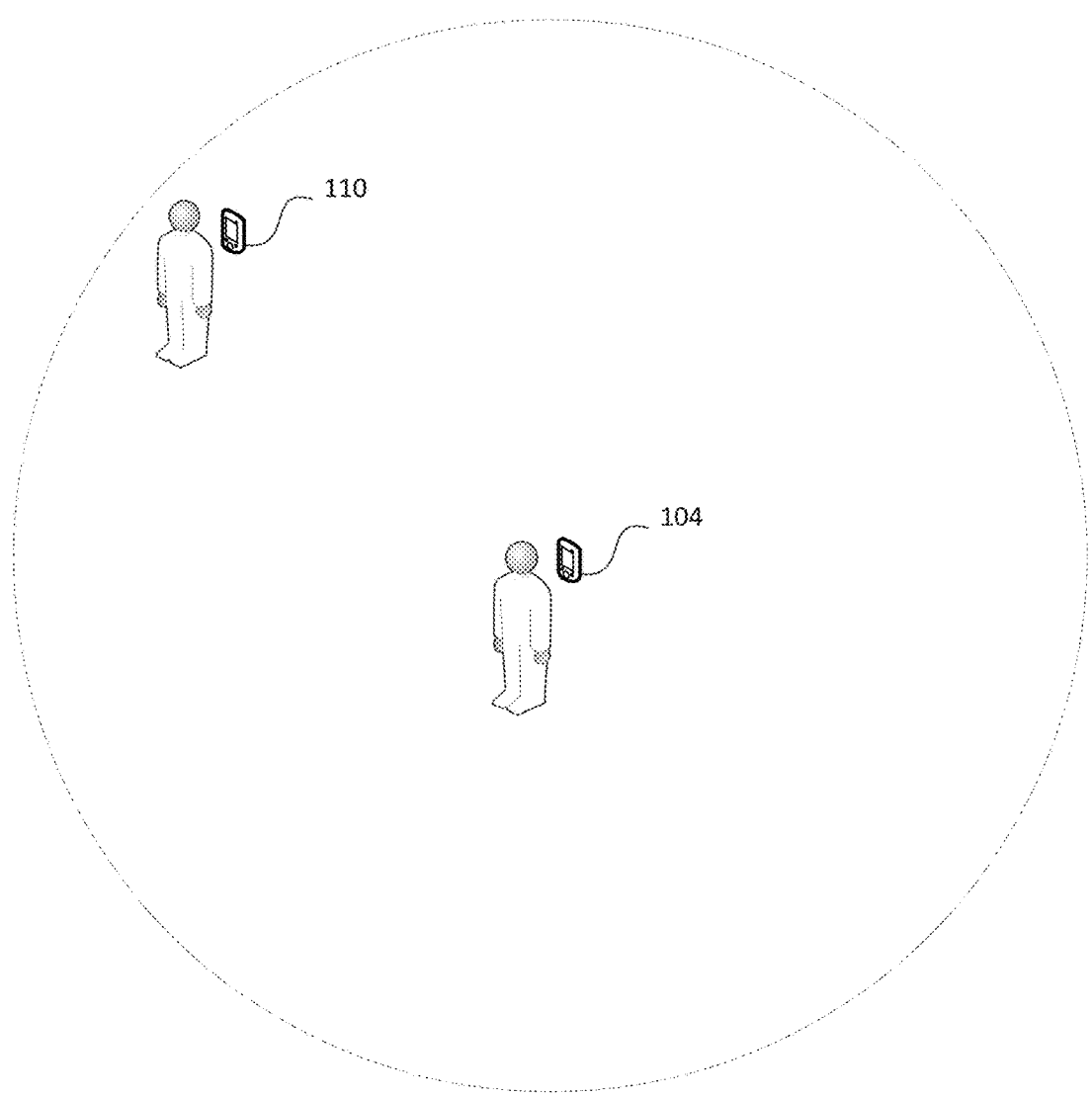
FIG. 5 is a diagram depicting an environment for discovering and viewing electronic wardrobes according to one embodiment.

User device 110 may begin detecting or discovering NFC signals of other devices. For example, as shown in FIG. 5, user device 110 may be located within communication device 104's wireless broadcast range. Thus, user device 110 may detect or discover NFC signals, such as BLE signals, broadcasted by communication device 104. User device 110 may analyze and read the signals to determine whether they include information related to electronic wardrobes. For example, NFC signals broadcasted from communication device 104 may include a predetermined data format or convention indicating that the signal is dedicated to communicating electronic wardrobes. The NFC signals for electronic wardrobes may include unique identification numbers of electronic wardrobes being broadcasted. In an embodiment, the NFC signals may include URL links indicating network address of where the respective electronic wardrobes are stored.

At step 304, user device 110 may present a list of electronic wardrobes of users discovered near user 105. The list of electronic wardrobes may include names of the wardrobe, names of the owners, pictures of the owners, URL links, wardrobe ID's, and the like. User 105 may match a picture of a particular owner with the particular owner user 105 sees in person to identify the particular owner's electronic wardrobe from the list. In an embodiment, a relative distance between user device 110 and the respective other devices may be determined based on the strength of NFC signals received by user device 110. The relative distance between user device 110 and the respective other devices may be used to identify the respective owners of the electronic wardrobes broadcasted from their devices.

At step 306, user device 110 may receive user 105's selection of an electronic wardrobe from the list of discovered electronic wardrobes. For example, based on owner pictures included with the list, user 105 may identify and select the electronic wardrobe associated with the person who is wearing or carrying an item user 105 is interested in.

At step 308, user device 110 may display the selected electronic wardrobe to user 105. In particular, user device 110 may access the data or information related to the selected electronic wardrobe stored at payment provider server 170. User device 110 may send a request to retrieve information for the selected electronic wardrobe to payment provider server 170. The request may include the selected wardrobe's unique ID or URL link. Based on the privacy settings of the selected wardrobe, payment provider server 170 may format or generate a specific level of information to display the selected wardrobe at user device 110. For example, if the privacy settings of the selected wardrobe allow only friends to view all of the wearable items in the selected wardrobe and user 105 is a friend of the owner of the selected wardrobe, payment provider server 170 may allow user 105 to view all of the wearable items in the selected wardrobe. Otherwise, if user 105 is not a friend, user 105 may have a restricted view of the selected electronic wardrobe.

User 105 may browse through the selected electronic wardrobe to find the wearable item user 105 is interested in. The electronic wardrobe may provide various information regarding the wearable item user 105 is interested in, including brand name, manufacturer, price, places to buy, color, size, pictures, videos, descriptions, and the like. In particular, a link may be provided to allow user 105 to purchase the wearable item.

At step 310, payment provider server 170 may receive a purchase request from user 105 to purchase the wearable item user 105 is interested in. In an embodiment, payment provider server 170 may redirect the purchase request to merchant server 140 of the merchant selling the wearable item. As such, merchant server 140 may process the purchase transaction with user 105. In some embodiments, if user 105 is using the payment service provider, e.g., payment provider server 170, to process the payment for the purchase, payment provider server 170 may directly process the purchase transaction and then send the purchase order to merchant server 140 after the payment has been processed for the purchase.

At step 312, merchant server 140 or payment provider server 170 may process the purchase transaction for the wearable item. If payment service provider is used to make payment for the purchase, payment provider server 170 may process the payment transaction between user 105 and the merchant by debiting from user 105's payment account and crediting merchant's account for the price of purchase. After the purchase transaction is completed, a notification may be forwarded to payment provider server 170 to indicate that a purchase has been made by user 105 through viewing the selected electronic wardrobe. For example, cookies may be used to back track user 105's browsing activities to determine the original source of advertisement that resulted in the final purchase by user 105.

At step 314, the owner of the selected electronic wardrobe may be rewarded for being the original source of advertisement that resulted in user 105's purchase of the wearable item. Incentives, such as reward points, cash backs, discounts, and the like, may be rewarded to the owner of the selected electronic wardrobe that presented the wearable item to user 105. Thus, consumers may be enticed to share their electronic wardrobes to others to help advertise various wearable items for the merchants or manufacturers.

In an embodiment, the system may analyze various trends in wearable items. For example, a list of most viewed wearable items may be determined based on viewing history of various electronic wardrobes. In another example, a list of most purchased wearable items may be determined based on purchases made from various electronic wardrobes. Thus, fashion trends in wearable items may be generated based on the viewing or purchase history of consumers' electronic wardrobes. Trends may be determined for different geographic regions or for different demographic groups. In another embodiment, fashion recommendations or suggestions may be generated based on current fashion trend.

By using the above process 300, a list of electronic wardrobes of other users located near user 105 may be discovered via NFC. User 105 may select one or more electronic wardrobes for viewing. User 105 may find out more about wearable items that are worn by other users. Further, interface may be provided to allow user 105 to purchase the wearable item presented in another user's electronic wardrobe. Incentives may be rewarded to owners of electronic wardrobes that help advertise and resulted in the final purchase of wearable items.

The above processes 200 and 300 may be executed by payment provider server 170. In another embodiment, the above processes 200 and 300 may be executed by merchant server 140 or user device 110. In still another embodiment, the above processes 200 and 300 may be executed by one or more of user device 110, communication device 104, merchant server 140, and payment provider server 170 in coordination with each other.

The following are exemplary scenarios in which the above processes 200 and 300 may be implemented.

Example 1

Joe just purchased a shirt. Joe used a PayPal app on his mobile phone to pay for the purchase. During the payment process, the PayPal app determined that Joe is purchasing a wearable item. The PayPal app asked Joe whether the shirt should be added to Joe's electronic wardrobe. After Joe's confirmation, PayPal adds the newly purchased shirt into Joe's electronic wardrobe. PayPal maintains a database of electronic wardrobes for users. Joe's electronic wardrobe is accessible by a unique URL "www.paypal.com/wardrobe/joe." As such, Joe may login to his electronic wardrobe to make any changes, such as adding or removing certain wearable items, changing privacy settings, and the like.

Joe makes the newly purchased shirt viewable by everyone. Joe's mobile phone broadcasts Joe's electronic wardrobe to other devices near Joe via NFC. In particular, the URL or a unique ID of Joe's electronic wardrobe is broadcasted with Joe's picture. Joe is hanging out in a coffee shop wearing his new shirt. Jane, another customer at the coffee shop, sees Joe's new shirt and is interested in finding out more about the shirt. Jane activates the PayPal app on her mobile phone to discover electronic wardrobes being broadcasted near Jane. A list of electronic wardrobes including Joe's electronic wardrobe is discovered and presented to Jane at Jane's mobile phone.

Jane is able to identify Joe's electronic wardrobe based on Joe's picture included with Joe's electronic wardrobe. Jane selects Joe's electronic wardrobe for viewing. In particular, Jane's mobile device accesses Joe's electronic wardrobe at PayPal's database. Because Jane is not Joe's friend, only wearable items that are viewable by everyone are displayed to Jane. Jane browses and finds the new shirt at Joe's electronic wardrobe. Jane finds out where Joe purchased the shirt, brand, model, description, color, and size of the shirt. A link also is provided to direct Jane to a website of a merchant that sells the shirt. Jane visits the merchant's website and purchases the shirt for her brother. PayPal is notified that a purchase has been made based from Joe's electronic wardrobe. As such, PayPal rewards Joe with reward points or discounts from the merchant.

Jane also looks at other wearable items on Joe's electronic wardrobe. Jane likes Joe's taste and fashion style and decides to bookmark Joe's electronic wardrobe or to follow Joe's electronic wardrobe. Thus, PayPal may notify Jane when new wearable items are added to Joe's electronic wardrobe. Joe's electronic wardrobe has a new follower which may earn Joe additional offers or incentives from various merchants.

If Joe gains popularity, merchants may sponsor Joe or ask Joe to wear or promote various wearable items from the merchants. For example, Joe may agree to wear a pair of jeans from a merchant and if enough people view or purchase the pair of jeans on Joe's electronic wardrobe, the merchant may give the pair of jeans to Joe for free or may give Joe reward points redeemable at the merchant for other products.

Accordingly, the system may allow consumers to easily obtain information regarding wearable items worn by various consumers. The system also may entice consumers with incentives to advertise for merchants by making their electronic wardrobes viewable by others. Thus, the system may provide additional means of advertisement for merchants of wearable items and may help increase sales and business.

Figure 4:
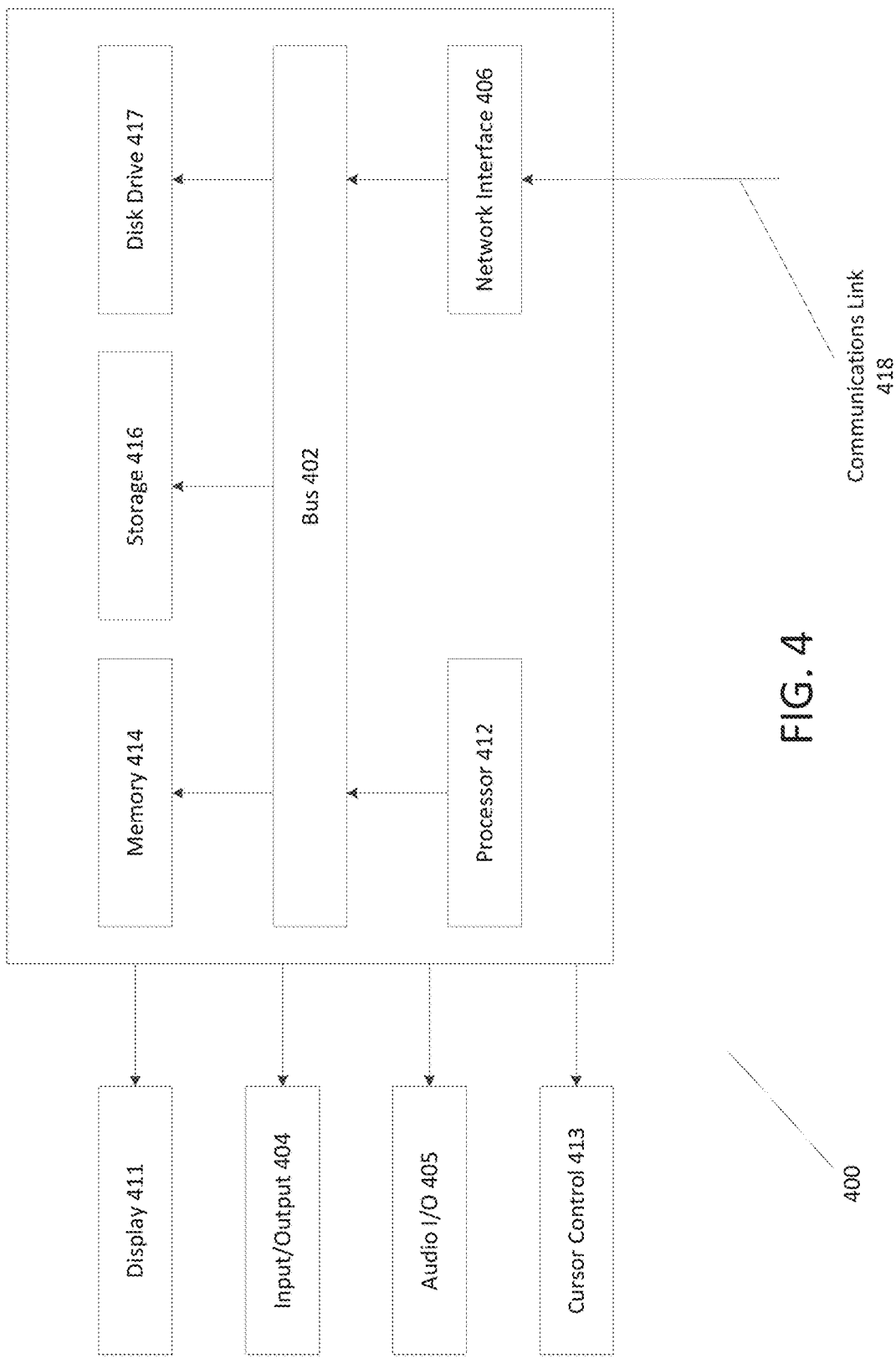
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, Bluetooth device, key FOB, badge, wearable computing device, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 160. In one embodiment, the transmission is wireless, although other transmission mediums and methods may also be suitable. A processor 412, which can be a microcontroller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
   detecting a payment request for a purchase associated with a user;
   analyzing one or more details of the payment request to identify that the purchase corresponds to a wearable item;
   in response to determining that the purchase corresponds to the wearable item, updating a record in a database corresponding to an electronic wardrobe of the user, to include the wearable item;
   and
   causing information related to the electronic wardrobe of the user to be broadcasted, by a communication device of the user via Bluetooth communication, to one or more other devices of other users that are within a threshold distance of the communication device;
wherein the electronic wardrobe comprises a list of wearable items owned by the user that includes the wearable item, and wherein the electronic wardrobe is associated with:
privacy settings defining one or more viewing restrictions for the list of wearable items; or
broadcast settings for each wearable item defining when and where each wearable item is viewable by others.

2. The system of claim 1, wherein the information related to the electronic wardrobe of the user is broadcasted via Bluetooth Low Energy (BLE).

3. The system of claim 1, wherein the information related to the electronic wardrobe comprises a unique identifier assigned to the electronic wardrobe of the user that enables a device of the one or more other devices to locate the record corresponding to the electronic wardrobe of the user from a plurality of records in the database.

4. The system of claim 1, wherein the information related to the electronic wardrobe comprises a Uniform Resource Locator (URL) indicating a file location of the record corresponding to the electronic wardrobe of the user within the database.

5. The system of claim 1, wherein the electronic wardrobe comprises product information for each of the wearable items on the list.

6. The system of claim 1,
wherein the electronic wardrobe of the user is associated with a sodas network account of the user, and
wherein the privacy settings corresponding to the electronic wardrobe are determined based on the social network account of the user.

7. The system of claim 1,
wherein the operations further comprise:
detecting a device of the one or more other devices attempting to access the record corresponding to the electronic wardrobe of the user;
determining, based on referencing the privacy settings, that the device of the one or more other devices is not to be granted access to the record corresponding to the electronic wardrobe; and
in response to determining that the device of the one or more other devices k not to be granted access to the record corresponding to the electronic wardrobe, denying access to the device of the one or more other devices.

8. A method comprising:
detecting a payment request for a purchase associated with a first user;
analyzing the payment request to identify that the payment request corresponds to a wearable item;
in response to determining that the payment request corresponds to the wearable item, updating a record in a database corresponding to an electronic wardrobe of the first user, to include the wearable item;
causing information related to the electronic wardrobe of the first user to be broadcasted, by a first communication device of the first user via Bluetooth communication, to a second communication device of a second user within a threshold distance of the first communication device;
receiving a request from the second communication device for purchasing the wearable item presented in broadcasted information related to the electronic wardrobe;
processing a purchase transaction for purchasing the wearable item; and
providing an incentive to the first user corresponding to the electronic wardrobe in response to the purchase transaction.

9. The method of claim 8, wherein the information related to the electronic wardrobe of the first user is broadcasted via Bluetooth Low Energy (BLE).

10. The method of claim 8, wherein the information related to the electronic wardrobe comprises a unique identifier, and wherein the method further comprises:
receiving a communication from the second communication device including the unique identifier;
determining that the unique identifier corresponds to the record in the database; and
providing access to the record in the database to the second communication device.

11. The method of claim 8, wherein the information related to the electronic wardrobe comprises a Uniform Resource Locator (URL) indicating a file location of the record corresponding to the electronic wardrobe of the first user within the database.

12. The method of claim 8, wherein the electronic wardrobe comprises a list of wearable items owned by the first user.

13. The method of claim 12, wherein the information that is broadcasted comprises information describing a plurality of wearable items contained on the list and viewable by the second user through the second communication device based on one or more privacy settings corresponding to the electronic wardrobe.

14. The method of claim 13,
wherein the electronic wardrobe of the user is associated with a social network account of the first user, and
wherein the one or more privacy settings are determined based on the social network account of the first user.

15. The method of claim 8, further comprising:
analyzing a viewing history of a plurality of electronic wardrobes; and
determining a popularity trend among various wearable items based on the viewing history.

16. A method, comprising:
detecting a payment request, for a purchase, associated with a user;

analyzing the payment request to identify that the payment request corresponds to a wearable item;

in response to determining that the payment request corresponds to the wearable item, causing an update to a record in a database corresponding to an electronic wardrobe of the user, to include the wearable item; and causing a communication device of the user to broadcast, via Bluetooth Low Energy (BLE), information related to the electronic wardrobe of the user to one or more other devices that are within a threshold distance of the communication device;

wherein the electronic wardrobe comprises a list of wearable items owned by the user that includes the wearable item, and wherein the electronic wardrobe is associated with:

privacy settings defining one or more viewing restrictions for the list of wearable items; or broadcast settings for each wearable item defining when and where each wearable item is viewable by others.

17. The method of claim 16, wherein the electronic wardrobe comprises a list of wearable items purchased by the user.

18. The method of claim 16, further comprising:

associating the electronic wardrobe with a social network account of the user; and Determining privacy settings based on the social network account of the user.

19. The method of claim 16, further comprising:

detecting a device of the one or more other devices is attempting to access the record;

determining, based on the privacy settings, that the first device should not be granted access to the record; and in response to determining that the first device should not to be granted access to the record, preventing the first device from accessing the record.

20. The method of claim 16, wherein the information related to the electronic wardrobe comprises:

a unique identifier assigned to the electronic wardrobe of the user, the unique identifier being associated with the record; or a Uniform Resource Locator (URL) indicating a file location of the record.

21. The system of claim 1, wherein the operations further comprise:

determining a congestion level of an area in which a communication device of a user is located, wherein a physical range of the broadcasted information varies based on the determined congestion level.

* * * * *